United States Patent [19]

Buchs et al.

[11] 4,352,631
[45] Oct. 5, 1982

[54] HINGELESS ROTOR, ESPECIALLY FOR A HELICOPTER

[75] Inventors: Wolfgang Buchs, Valley; Franz Nowak, Taufkirchen; Rudolf Woerndle, Brunnthal, all of Fed. Rep. of Germany

[73] Assignee: Messerschmitt-Boelkow-Blohm GmbH, Munich, Fed. Rep. of Germany

[21] Appl. No.: 141,281

[22] Filed: Apr. 17, 1980

[30] Foreign Application Priority Data

Apr. 28, 1979 [DE] Fed. Rep. of Germany ........ 2917301

[51] Int. Cl.$^3$ ............................................. B64C 27/38
[52] U.S. Cl. ................................. 416/134 A; 416/141
[58] Field of Search ................ 416/134 A, 138 A, 141

[56] References Cited

U.S. PATENT DOCUMENTS

| 3,261,407 | 7/1966 | Culver et al. | 416/135 X |
| 3,330,362 | 7/1967 | Kastan | 416/135 X |
| 3,606,575 | 9/1971 | Lermusiaux | 416/138 A X |
| 3,880,551 | 4/1975 | Kisovec | 416/134 A |
| 3,999,886 | 12/1976 | Ormiston et al. | 416/141 X |
| 4,111,605 | 9/1978 | Roman | 416/138 A X |
| 4,182,597 | 1/1980 | Derschmidt | 416/134 A |
| 4,266,912 | 5/1981 | Roman | 416/141 |

Primary Examiner—Everette A. Powell, Jr.
Attorney, Agent, or Firm—W. G. Fasse; D. F. Gould

[57] ABSTRACT

A connecting element for securing a rotor blade to the rotor hub of a helicopter rotor comprises at least two components arranged at an angle relative to each other. At least one component extends outside the boundary of the other component on both sides of the other component. Slots are arranged in at least one of the components and these slots extend substantially toward the shearing center or rather toward the central shearing axis. Additionally, each connecting element has a flattened zone adjacent to the rotor hub to function as a flapping hinge. The connecting element also functions as a lead-lag hinge and as a torsion hinge.

18 Claims, 8 Drawing Figures

HINGELESS ROTOR, ESPECIALLY FOR A HELICOPTER

BACKGROUND OF THE INVENTION

The invention relates to a hingeless rotor, especially for helicopters whereby the rotor has at least two rotor blades each of which is secured through a connecting element to the rotor hub. Each connecting element functions as a flapping hinge, as a lead-lag hinge, and as a torsion hinge. Such hingeless rotors are suitable for use as lifting rotors or as tail rotors in helicopters or rotary wing aircraft.

German Patent Publication (DE-AS) No. 1,531,375 discloses a rotor in which each rotor arm comprises a blade angle sleeve in which a blade root sleeve is rotatably supported. The arrangement is such, that the blade root sleeve can perform the blade angle movements caused through a control rod. A neck section of the rotor blade is secured to the blade root sleeve and such neck section merges into the blade root. The neck section forms an integral or one piece extension of the carrier bar of the wing section of the rotor blade. The neck section is so constructed that it is flexible in the lead-lag direction and in the flapping direction while being simultaneously stiff against torsion loads. The cross-section of the neck section is so constructed that the bending loads in the lead-lag direction and in the flapping direction are substantially equal to each other. In this prior art rotor it is necessary to provide a bearing which is formed by the blade angle bearing sleeve and by the blade root sleeve in order to permit the blade angle movements.

Another prior art rotor has been constructed without such bearings so that the rotor is entirely hingeless. In order to realize such a construction, a leaf spring type connecting element is clamped to the rotor hub at one of its ends while the other end of the connecting element merges into the blade root. The desired load stiffness or flexibility in the flapping direction is achieved on the one hand by the leaf spring action of the connecting elements formed as a laminated body. On the other hand, such load stiffness is also facilitated by the partially elastic clamping of the connecting element at its end adjacent the rotor hub. Due to this clamping and due to the flexibility of the leaf spring, it is possible to perform the blade angle movement in response to a control lever forming an integral part of the blade root zone. A connecting element of the just described type is disclosed in U.S. Pat. No. 3,880,551. However, this type of arrangement has the disadvantage that the stiffness of the connecting element in the lead-lag direction and in the direction of the blade angle or torsion movement is relatively large. Additionally, the elastic clamping of the connecting element adjacent to the rotor hub is rather expensive if it can be realized in practice at all.

OBJECTS OF THE INVENTION

In view of the above it is the aim of the invention to achieve the following objects singly or in combination:

to construct a hingeless rotor, or rather connecting elements, for such hingeless rotor, which is capable of functioning as a flapping hinge, as a lead-lag hinge, and as a blade angle adjustment or torsion hinge, whereby the respective hinging action shall be limited to precisely defined local areas or zones along the connecting element;

to precisely control the degree of the flexibility for the flapping movement and for the lead-lag movement;

to keep the torsion stiffness in an advantageous low range and to make sure that the reset moment of the twisted cross-section of the connecting element in response to centrifugal force is as small as possible;

to locate the effective flapping hinge and the effective lead-lag hinge relatively close to the rotor hub;

to couple the flapping movement and the lead-lag movement in such a manner as to achieve an aerodynamic damping; and to make sure that the torsion loads to which the connecting elements are exposed, are caused substantially only by the twisting by means of the respective control lever position.

SUMMARY OF THE INVENTION

According to the invention the cross-section of each connecting element is determined by at least two components connected with each other to include an angle between the two components. At least one of the two components protrudes on both sides over the boundary of the respective other component. A slot is arranged in at least one of the element components. The slot, or a plurality of slots, extends substantially radially toward the shearing center of the connecting element, or rather, the central shearing axis of the connecting element and in the longitudinal direction of the connecting element.

The hingeless rotor according to the invention has the advantage that the torsion stiffness may be reduced to a precisely defined value by the slots. Further, the desired flapping stiffness, or rather, flexibility, and the lead-lag stiffness or flexibility may be located in precisely defined zones by the structural features of the present connecting elements. These zones extend longitudinally between the blade root and the rotor hub or rotor head.

If the cross-sectional area of the connecting element as taught herein has an inertia moment corresponding to the desired flapping and/or lead-lag stiffness or flexibility then it is possible to precisely determine the value of and locate the flapping stiffness and the lead-lag stiffness.

The components of the present connecting elements are preferably made of fiber compound materials. Each component includes a longitudinal tension transmitting belt and a shearing load resistant web. The fibers extend in one direction longitudinally in the tension transmitting belt which is relatively yielding to shearing forces and is arranged in an outer zone of the respective component. The shearing load resistant webs on the other hand are arranged in an inner zone of each component and are made of fibers crossing each other substantially at an angle to the direction in which the centrifugal force is effective. The fibers form fiber compound layers in such a manner that the cross-section satisfies the requirements regarding bending loads as well as regarding the occurring shearing loads. Shearing flows in the shearing stiff fiber layers contribute but little to the torsion resistance of the entire cross-section because the lever arms are rather small relative to the shearing center. The tension belts contribute primarily to the bending stiffness of the connecting element due to their high tensile strength or longitudinal stiffness and due to their spacing relative to the neutral axis.

BRIEF FIGURE DESCRIPTION

In order that the invention may be clearly understood, it will now be described in more detail, by way of example, with reference to the accompanying drawings, wherein.

Figure 1:
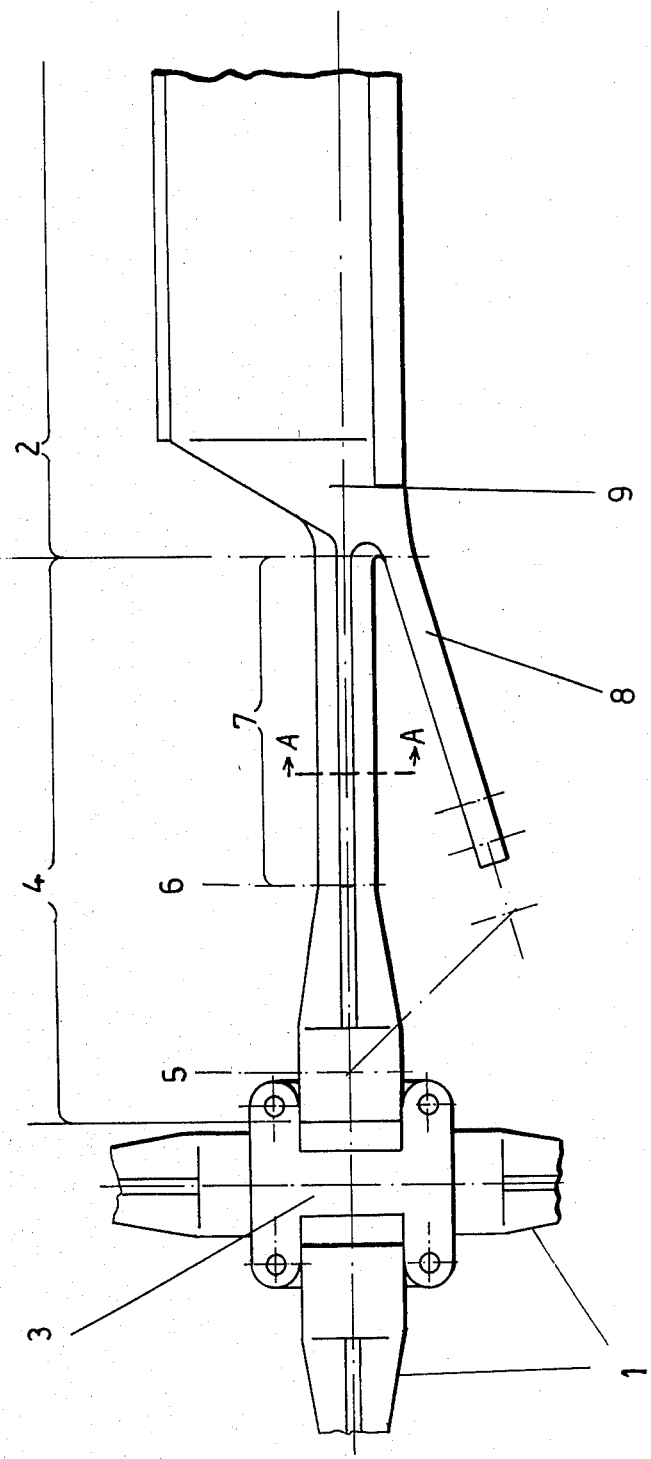
FIG. 1 shows a top plan view of one embodiment of a hingeless rotor according to the invention in which the connecting element has a cross-type cross-section substantially corresponding to that shown in FIG. 5A.
Figure 4A:
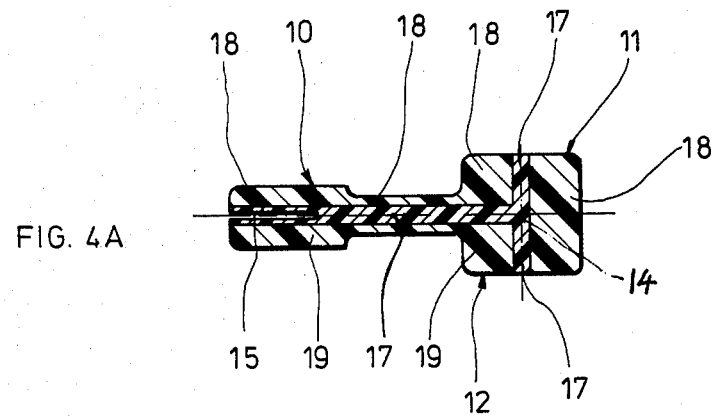
Figure 4B:
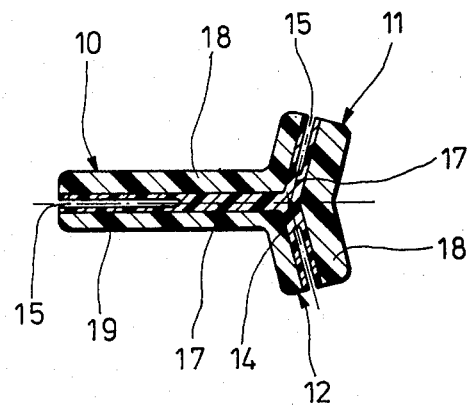
Figure 4C:
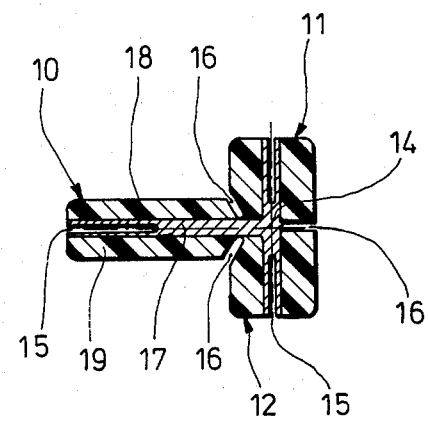
Figure 5A:
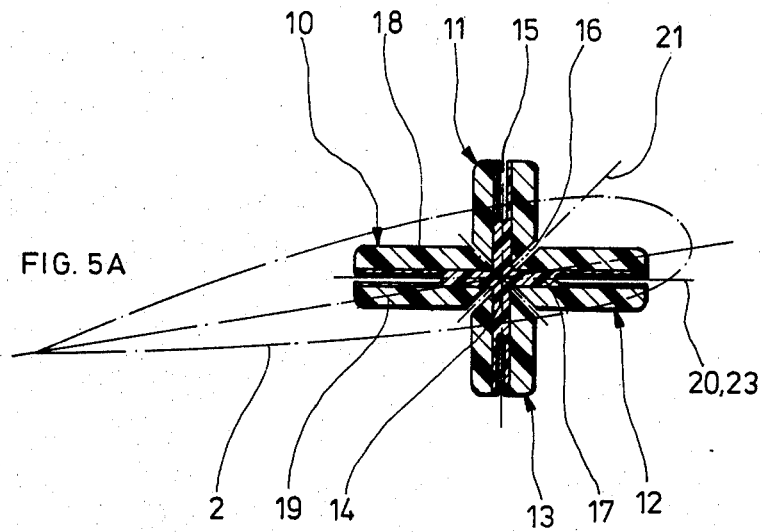
Figure 5B:
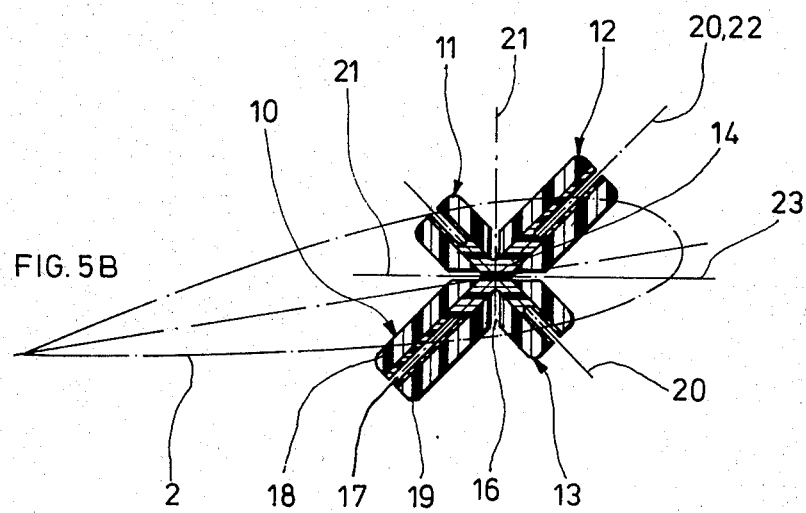

FIGS. 4A, 4B, and 4C show cross-sectional views through a connecting element according to the invention having substantially a T-cross-sectional shape;

FIG. 5A shows cross-sectional view substantially along section line A—A in FIG. 1 through a connecting element according to the invention having a cross-type cross-section; and FIG. 5B is a view quite similar to that of FIG. 5A, however, showing a slightly differently dimensioned cross-type cross-section.

DETAILED DESCRIPTION OF PREFERRED EXAMPLE EMBODIMENTS AND OF THE BEST MODE OF THE INVENTION

FIG. 1 shows a top plan view of a rotor 1 according to the invention. Only a portion of one rotor blade 2 is shown. The rotor blade 2 is operatively connected to the rotor hub 3 by a connecting element 4 according to the invention extending between the blade root 9 and the hub 3 proper. A control lever 8 extends laterally outwardly from the blade root 9. The connecting element 4 is made of fiber compound material.

Figure 2:
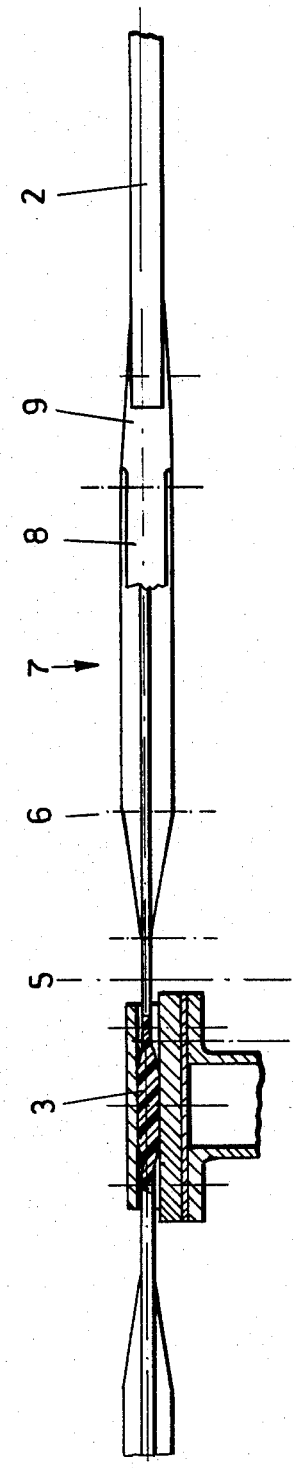
FIG. 2 is a side view of the rotor of FIG. 1 with a control lever shown partly broken away.
Figure 3:
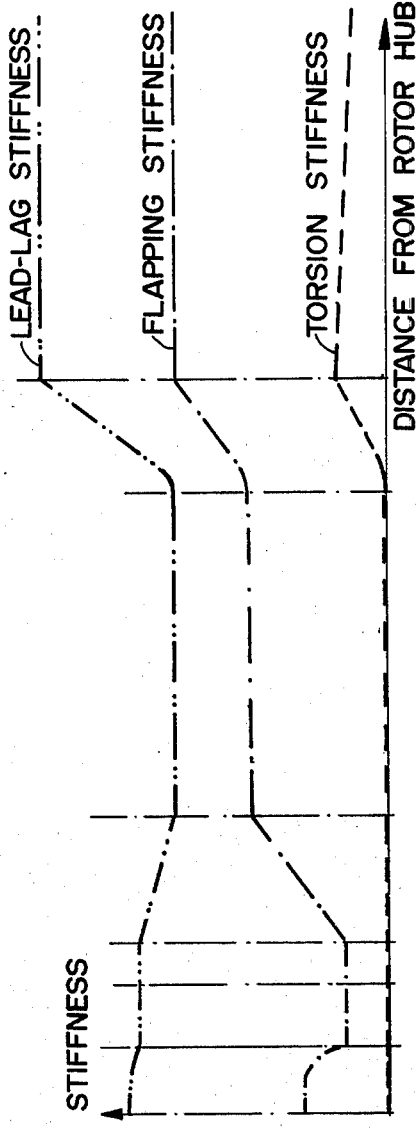
FIG. 3 is a schematic diagram of the several stiffness or resistance characteristics as a function of the radial distance from the rotational axis of the rotor.

As shown in FIGS. 1 and 2, the connecting element 4 is relatively flat in the transition zone 5 forming an effective flapping hinge, which has a relatively flat substantially rectangular cross-section, one end of which is operatively connected to the rotor hub. Adjacent to the hub 3 the flapping hinge 5 is flexible relative to flapping movements, but stiff or resistant relative to lead-lag movements. In the plane of the drawing of FIG. 1, the relatively flat flapping hinge 5 tapers radially outwardly and in the plane of FIG. 2 it tapers radially inwardly to form an effective or equivalent lead-lag hinge 6 which in turn merges into a zone 7 forming an effective or equivalent torsion hinge. The torsion hinge zone 7 may have any one of the cross-sections shown in FIGS. 4A, 4B, 4C, 5A, or 5B. This type of structure of the connecting element 4 results in a hingeless rotor which has a flapping and lead-lag as well as torsion stiffness, or rather flexibility, which are individually allocated to specific zones of the length of the connecting element in accordance with a prior, or rather with a desired determination. The characteristic curves or distributions of these stiffnesses are shown in FIG. 3 for the embodiment of FIGS. 1 and 2. Starting from the rotational axis of the hub, the flapping stiffness decreases toward the zone 5 in which it stays constant. From the zone 5 the flapping stiffness increases toward the zone 6 whereafter it remains constant in the zone 7 of the torsion hinge until it rises again in the zone 9 of the blade root to reach its highest value in the blade 2 itself. Thus, in the zone 5 where the flapping stiffness is lowest, an equivalent flapping hinge is formed. The lead-lag stiffness is shown in the uppermost curve in FIG. 3. However, the lead-lag stiffness does not increase again after passing through the zone 6 until the lead-lag stiffness rises in the blade root 9. In the zone 6 the lead-lag stiffness decreases until it follows the constant value in the zone 7. The torsion stiffness is substantially constant in zones 5, 6, and 7 to slightly rise in the blade root 9. Thus, the twisting of the connecting elements 4 begins at a fixed spacing from the rotational axis of the rotor hub 3 and it may take place in the portion of the connecting element extending all the way to the blade root. The length of this section is so dimensioned that predetermined, permissible torsion loads are not exceeded.

Connecting elements capable of providing the stiffness characteristics shown in FIG. 3, have cross-sectional configurations as shown in FIGS. 4A, 4B, 4C as well as 5A and 5B, whereby in each instance the cross-section would extend through the zone 7 in FIG. 1 along section line A—A as indicated for FIG. 5A. The cross-sectional configurations of the connecting elements 4 have a T-shape as shown in FIGS. 4A, 4B, and 4C. The T-configuration comprises three components 10, 11, and 12 which enclose an angle between two adjacent components. Thus, for example, in FIG. 4A the angle between the component 11 and the component 10 is a right angle and the angle between the components 11 and 12 is an angle of 180°. These components form an integral, single piece unit. Each component 10, 11, and 12 comprises a shearing load resistant web 17 flanked on both sides by tension transmitting belts 18 and 19 solidly connected to the respective shearing load resistant web 17. The shearing load resistant webs 17 are made of fiber compound layers in which the individual fibers cross each other at an angle of $\beta$ corresponding, for example, to $\pm 45°$. The cross-over fiber layers of the shearing web or webs 17 are arranged in an inner zone of the connecting elements 4. These so-called $\pm\beta$-layers are necessary because the cross-section is subject to bending loads as well as to shearing loads. Due to the small lever arms relative to the shearing center or rather, shearing center axis 14, any shearing flows in these shearing resistant fiber compound layers of the shearing webs 17 contribute little to the torsion stiffness of the entire cross-section of the connecting element.

The tension belts 18 and 19 arranged in the outer zone of the connecting element 4 contribute primarily to the bending stiffness of the connecting element due to their high tensile strength in the longitudinal direction and due to their spacing relative to the neutral axis of the connecting element. If the connecting elements 4 with their T-shaped cross-section are respectively arranged relative to the plane of rotation, the bending stiffness in the lead-lag direction is relatively large, however, substantially smaller in the flapping direction.

The connecting element 4 having the cross-sectional shape shown in FIG. 4A comprises a slot 15 extending in the shearing web 17 of the component 10 from the outer edge radially toward the shearing center 14. Such slots 15 are provided in the connecting element 4 of FIG. 4B also in the remaining components 11 and 12. Even in the tension belts 18 and 19, slots 16 may be provided extending toward or substantially toward the shearing center 14 as shown in FIG. 4C. With the aid of these slots it is possible to reduce the torsion stiffness in a precisely defined manner without noticeably influencing the bending stiffness of the connecting elements 4.

In FIGS. 5A and 5B the slots 15 and 16 also extend radially toward the shearing center 14 as shown.

The connecting elements 4 shown in FIGS. 5A and 5B having a cross-configuration in their sectional view are particularly suitable for realizing the desired stiffnesses. The components 10, 11, 12, and 13 of these connecting elements 4 enclose right angles between adjacent components. As in FIGS. 4A to 4C, the embodiments of FIGS. 5A and 5B are also made of fiber compound materials, whereby the shearing webs 17 are located in internal zones while the belts 18 and 19 are located in the outer zones. The length of the individual components of a connecting element may be the same for each component or each component may have a different length. For practical reasons, the components located in the same plane should have the same length. By the formation of the slots 15 and 16 it is possible to precisely determine the bending and torsion characteristics of these connecting elements. In all the cross-sectional embodiments shown in FIGS. 4A, 4B, 4C, 5A, and 5B the connecting element or rather its torsion hinge zone 7 has such a cross-sectional dimension that the respective inertia moment corresponds substantially to the intended flapping stiffness and/or to the intended lead-lag stiffness of the connecting element.

In the connecting elements shown in FIG. 5A the main inertia axis 20 of the connecting elements 4 is located in the rotational plane 23 or perpendicularly thereto. However, it is also possible to arrange the connecting element 4 differently relative to the rotational plane 23. Such a preferred arrangement is shown in FIG. 5B. In the arrangement of FIG. 5B the main inertia axis 20 of the connecting element 4 is located in a plane 22 which is inclined relative to the plane 23 of rotation. The plane 22 includes an angle of 45° with the plane 23 of rotation in the arrangement of the connecting element 4 shown in FIG. 5B.

In FIG. 5A the slots 15 extend in the plane 23 of rotation of the blade 2 and in a plane perpendicularly to the plane 23 of rotation while the slots 16 extend in planes 21 at an angle to the plane 23 of rotation, whereby the planes 21 divide the angle between two adjacent components 11, 12 substantially evenly. The arrangement is similar in FIG. 5B.

The geometric configurations for the cross-sections of the connecting element as shown in FIGS. 4A, 4B, 4C, and 5A, as well as 5B make sure that the individual partial surfaces of the connecting element have a very small spacing from the torsional longitudinal axis 20 best seen in FIGS. 5A and 5B. Thus, it is possible to keep the resetting moments caused by the centrifugal force in the twisted cross-section as small as possible. By placing the longitudinal slots 15 into the area of the main inertia axis of the connecting elements it is possible to reduce the torsion stiffness in an especially advantageous manner without influencing the bending stiffness in any noticeable manner. The reduction of the torsion stiffness can be further improved by placing the additional slots 16 into the tension belts 18, 19, as shown in FIGS. 5A, 5B.

By flattening the zone 5 directly adjacent the rotor head or hub 3 it is possible to place the flapping hinge as close as possible to the rotor hub. Similarly, by the shape of the zone 6 in combination with the flat zone 5 it is possible to limit the effective function of the flapping hinge and of the lead-lag hinge to precisely defined zones or locations. By placing the main inertia axis 20 into the rotor plane and/or in planes perpendicularly to the rotational plane of the wings, the flapping stiffness and the lead-lag stiffness may be located in precisely defined zones of the connecting elements. If the main inertia axes 20 are inclined relative to the rotary plane of the rotor wing, the lead-lag movement and the flapping movement are coupled to provide an aerodynamic damping.

By providing a biassing twist in the zone where the connecting element 4 merges into the blade root 9, the torsion load in the connecting element is reduced and any remaining torsion loads are due substantially only to the respective position of the control lever 8.

Although the invention has been described with reference to specific example embodiments, it will be appreciated, that it is intended, to cover all modifications and equivalents within the scope of the appended claims.

What is claimed is:

1. A connecting element (4) for securing a rotor blade (2) to a rotor hub (3) without hinging means, especially for a helicopter, comprising a torsion hinge zone (7) including at least two components (10, 11, 12, 13) connected to each other so that the components include an angle and form a common shearing axis (14), said components of said torsion hinge zone (7) being so dimensioned in their respective cross-section that at least one component extends with two sides outside of the other component whereby the other component is substantially enclosed and contacted by said one component, and slot means (15, 16) extending longitudinally through the connecting element at least in one of said two components, said slot means extending substantially radially toward said central shearing axis (14), whereby each connecting element functions as a flapping hinge (5), as a lead-lag hinge (6), and as a torsion hinge (7).

2. The connecting element of claim 1, wherein each of said components is made of fiber compound materials, each component comprising at least one shearing web capable of transmitting shearing loads, said shearing web having its fibers arranged in a cross-over relationship so that the fibers are inclined relative to the longitudinal axis of the connecting element, each component further comprising tension transmitting belt means, the fibers of which extend substantially longitudinally in parallel to said longitudinal axis of the connecting element.

3. The connecting element of claim 1, wherein said angle included by said components of each connecting element is a right angle whereby the components extend perpendicularly to one another.

4. The connecting element of claim 1, wherein said components form a T-shaped section of the respective connecting element, said T-shaped section including a leg (18) and a cross-bar (11, 12).

5. The connecting element of claim 6, wherein said common shearing axis (14) forms a main inertia axis, said slot means (15) extending radially toward said main inertia axis, said slot means further extending longitudinally along substantially the entire torsion hinge zone (7).

6. The connecting element of claim 4 or 5, comprising further slot means (16) extending substantially radially inwardly at the junction of the components forming the T-shaped section and also substantially radially inwardly in the central plane of symmetry of the cross-bar (11, 12) of the T-shaped section and also longitudinally along substantially the entire torsion hinge zone (7).

7. The connecting element of claim 1, wherein said components form a symmetric cross-shaped section.

8. The connecting element of claim 7, wherein said common shearing axis (14) forms a main central inertia axis (14), said slot means (15) extending radially toward said main central inertia axis, said slot means (15) further extending longitudinally along substantially the entire torsion hinge zone (7).

9. The connecting element of claim 7 or 8, comprising further slots means (16) extending radially inwardly at the junction of the components forming the cross-shaped section, said further slot means (16) extending in planes (21) substantially evenly dividing the angle enclosed by two adjacent components and also longitudinally along substantially the entire torsion hinge zone (7).

10. The connecting element of claim 1, wherein each component comprises shearing web means, said slot means (15) being arranged in said shearing web means.

11. The connecting element of claim 1, comprising tension transmitting belt means (18, 19) and further slot means (16) in said belt means, said further slot means also extending substantially radially toward said common shearing axis (14).

12. The connecting element of claim 1, wherein said common shearing axis forms a main inertia axis located in the plane of rotation of the rotor blade.

13. The connecting element of claim 1, wherein said common shearing axis forms a main inertia axis located in a plane extending perpendicularly to the plane of rotation of the rotor blade.

14. The connecting element of claim 1, having a main inertia plane extending at an angle to the plane of rotation of the rotor blade.

15. The connecting element of claim 1, wherein said rotor blade comprises a blade root, said connecting element comprising a radially outer end merging into said blade root, said blade root having a twist therein for applying a biassing torsion load to the blade root whereby the torsion stress level between the blade and the respective connecting element is reduced.

16. A connecting element (4) for securing a rotor blade (2) to a rotor hub (3) without hinging means, especially for a helicopter, comprising a torsion hinge zone (7) including at least two components (10, 11; 12, 13) connected to each other so that the components include an angle and form a common shearing axis (14), each component comprising shearing load resistant web means (17) for taking up shearing loads and tension load transmitting belt means (18, 19), said shearing load resistant web means being substantially enclosed and contacted by said tension load transmitting belt means (18, 19) except at a radially outer end or edge of each shearing load resistant web means (17), and slot means (15) extending radially in said shearing load resistant web means (17) radially toward said common shearing axis (14), said slot means (15) determining a desired low torsion stiffness of the connecting element without affecting a desired bending stiffness of the connecting element.

17. The connecting element of claim 16, wherein said slot means (15) begin at the radially outer end or edge of the respective shearing load resistant web means (17).

18. The connecting element of claim 16 or 17, comprising further slot means (16) also extending substantially radially through the tension load transmitting belt means (18, 19) toward said common shearing axis (14).

* * * * *

UNITED STATES PATENT AND TRADEMARK OFFICE
CERTIFICATE OF CORRECTION

PATENT NO. : 4,352,631

DATED : October 5, 1982

INVENTOR(S) : Wolfgang Buchs et al

It is certified that error appears in the above-identified patent and that said Letters Patent is hereby corrected as shown below:

Claim 5, (column 6, line 56) replace "claim 6" by --claim 4--.

Claim 9, (column 7, line 10) replace "slots" by --slot--.

Signed and Sealed this

Fourteenth Day of December 1982

[SEAL]

Attest:

Attesting Officer

GERALD J. MOSSINGHOFF

Commissioner of Patents and Trademarks